United States Patent [19]

Divjak et al.

[11] 4,216,422

[45] Aug. 5, 1980

[54] SOLID STATE MOTOR CONTROL CIRCUIT PROVIDING A DYNAMIC BRAKING FUNCTION

[75] Inventors: August A. Divjak, Waukesha; Peter Miczek, Milwaukee, both of Wis.

[73] Assignee: Johnson Controls, Inc., Milwaukee, Wis.

[21] Appl. No.: 12,282

[22] Filed: Feb. 15, 1979

[51] Int. Cl.² ............................................. G05B 5/01
[52] U.S. Cl. .................................. 318/612; 318/625
[58] Field of Search ............... 318/612, 625, 379, 380, 318/375, 256, 257, 258, 261, 273, 364, 368, 56, 57, 60, 63, 87

[56] References Cited

U.S. PATENT DOCUMENTS

| 3,548,283 | 12/1970 | Krohn | 318/612 |
| 3,906,299 | 9/1975 | Mittelstaedt | 318/87 |
| 3,976,925 | 8/1976 | Rudich, Jr. | 318/257 |

OTHER PUBLICATIONS

Fishman, *Electronic Design*, vol. 24, No. 10, p. 110, May 10, 1976.

*Primary Examiner*—J. V. Truhe
*Assistant Examiner*—Eugene S. Indyk
*Attorney, Agent, or Firm*—Emrich, Root, Lee, Brown & Hill

[57] ABSTRACT

A solid state motor control circuit for controlling the operation of a servo motor comprises a comparator circuit including a differential amplifier having its inputs connected across terminals of the motor and having its output connected to a drive circuit the output of which is connected to a supply terminal of the motor. A reference circuit maintains a reference terminal of the motor at a reference level, and in the absence of a command signal, the differential amplifier and drive circuit maintain the voltage at the motor supply terminal at the reference level. A control switch enabled by the command signal applies a control signal to an input of the differential amplifier, and the differential amplifier responsively enables the drive circuit to raise or lower the potential at the motor supply terminal relative to the reference level, thereby energizing the motor. Upon termination of the command signal, the control switch is disabled, removing the control signal from the input of the differential amplifier and through negative feedback, the differential amplifier and drive circuit return the voltage at the motor supply terminal to the reference level, approximating a dynamic braking function for stopping the motor.

10 Claims, 3 Drawing Figures

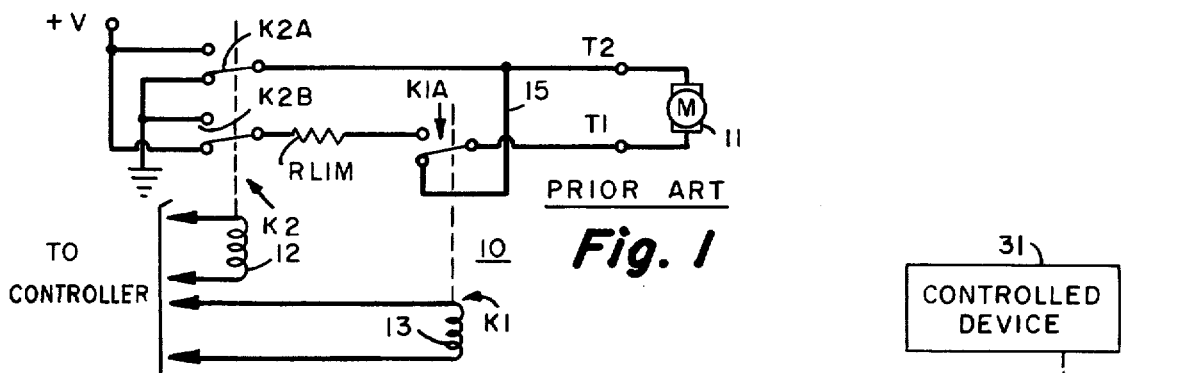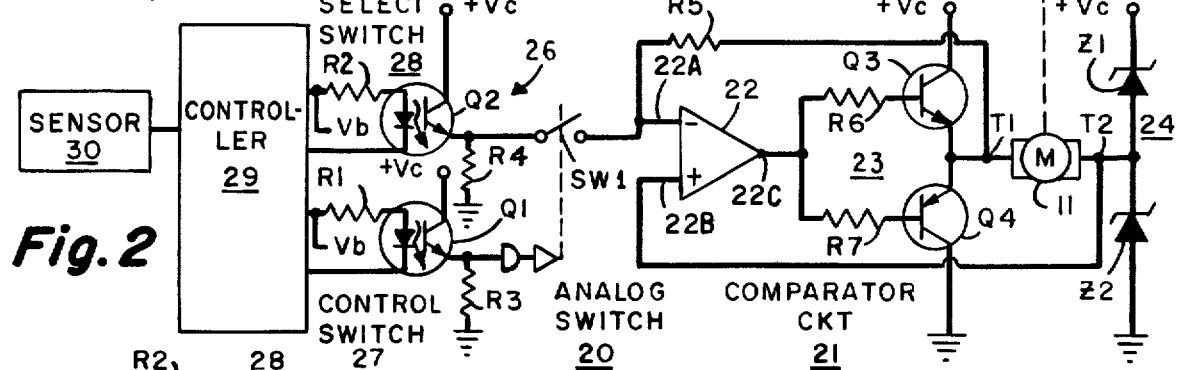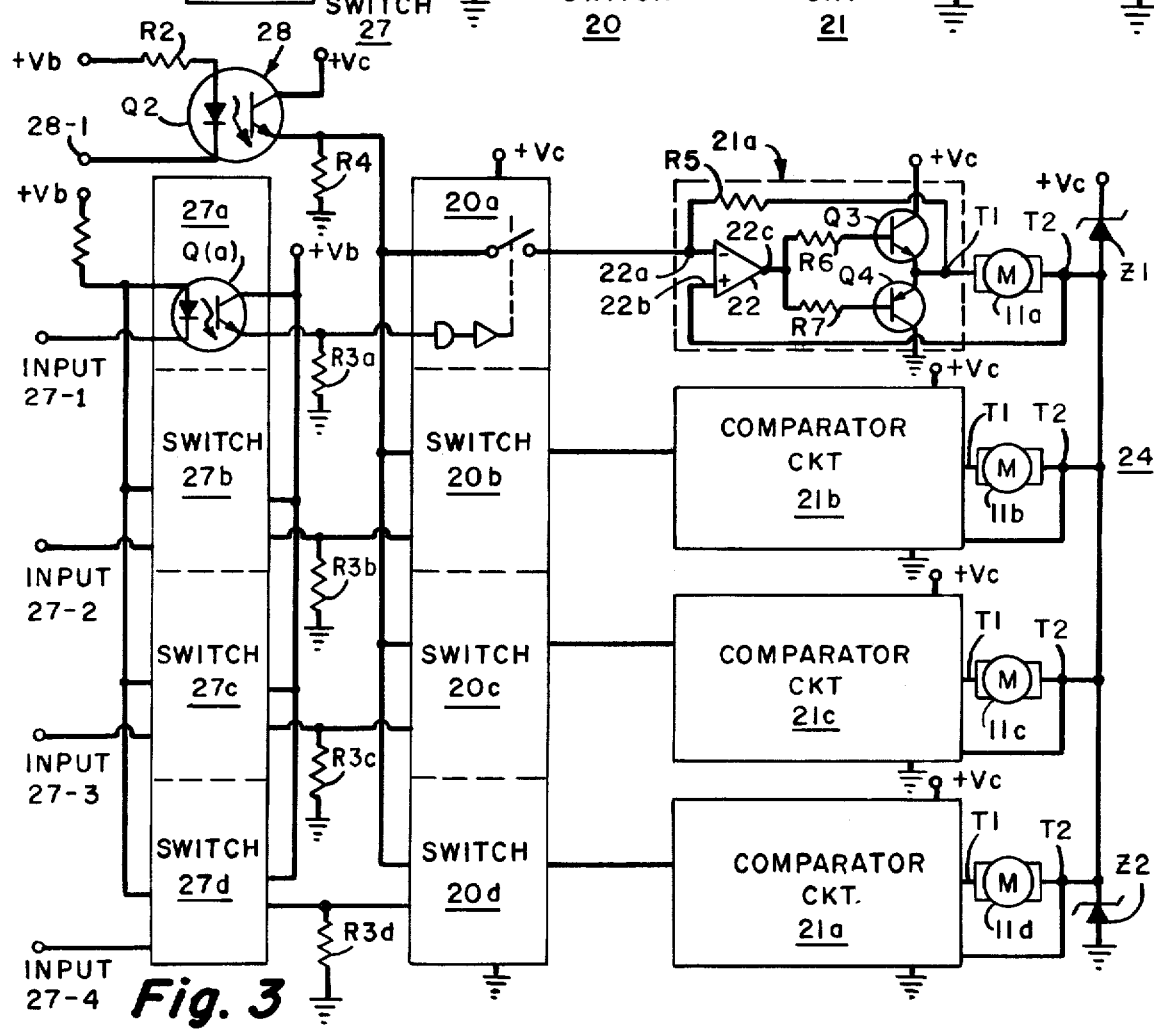

SOLID STATE MOTOR CONTROL CIRCUIT PROVIDING A DYNAMIC BRAKING FUNCTION

BACKGROUND OF THE INVENTION

1. Field of the Invention

This invention relates to motor control circuits for controlling the starting and stopping of servo motors, and more particularly to a solid state motor control circuit which approximates a dynamic braking function.

2. Description of the Prior Art

Many control systems employ small servo motors controlled by proportional controllers to operate functional devices for maintaining a specific system parameter at a set point value. For example, in heating and air conditioning systems, one or more motors may be selectively operated to move valves or dampers to correct for deviations of the temperature in a conditioned area from set point values. Whenever the temperature rises above or falls below the set point value, the proportional controller generates an error signal which is applied to a motor control circuit for operating a servo motor causing its associated valve or damper to move to effect compensation for the temperature change. The motor may also drive a potentiometer to provide a feedback signal to the proportional controller to indicate when the error has been corrected for.

In such applications, accurate control of the starting and stopping of the motor is essential to provide the desired correction for the deviation from the set point while avoiding overshoot. Accordingly, when the set point is reached, dynamic braking is normally used to stop the motor.

In applications in which the controller generates digital logic level signals for effecting energization of the motor, a control relay is generally used as an interfacing element between the motor and the control logic to isolate the motor supply from the digital logic circuitry. The control relay is energized by relatively low level signals provided by the control logic and when energized connects power at a higher level to the motor via its contacts. A further relay controls the polarity of the volage applied to the motor to select direction of travel for the motor shaft. When correction for the error signal has been achieved, the relays are deenergized, disconnecting power from the motor.

In known circuits, dynamic braking is provided using the control relay contacts to connect both terminals of the motor to ground when the control relay is deenergized. In such motor control circuits, the high currents induced in the motor circuit when the relay drops out, results in arcing at the relay contacts. This may result in welding or deterioration of the contacts, affecting reliability of the control circuit. While it is possible to modify the relays to increase reliability, this adds considerable cost to the control system.

SUMMARY OF THE INVENTION

The present invention provides a solid state motor control circuit which responds to logic level command signals provided by a controller to control the starting and stopping of a servo motor, and which approximates a dynamic braking function. The circuit also provides isolation of the motor voltage and the controller.

The motor control circuit comprises a comparator circuit including a differential amplifier having its inputs connected across terminals of the motor and having its output connected to a drive circuit which is connected to a supply terminal of the motor. A reference circuit, comprises of a pair of Zener diodes, provides a reference voltage at a reference terminal of the motor.

In the absence of a command signal, the differential amplifier and drive circuit maintain the voltage at the supply terminal at the reference level. When a command signal is provided, a control switch applies a control signal to an input of the differential amplifier, the polarity of the control signal being determined by a polarity select switch controlled by the controller. The differential amplifier responsively enables the drive circuit to raise or lower the potential at the supply terminal of the motor relative to the reference level, thereby energizing the motor to cause the motor shaft to be driven in the forward or reverse direction.

When correction for the error signal has been achieved, the control switch is disabled, removing the control signal from the input of the differential amplifier. A negative feedback circuit connected between the supply terminal of the motor and an input of the differential amplifier provides a feedback signal to the differential amplifier which responsively controls the drive circuit to return the voltage at the motor supply terminal to the reference level, halting the motor. The operation of the differential amplifier and associated drive circuit, in response to the negative feedback approximate a dynamic braking function.

The control switch and select switch comprise photo-optical devices which provide isolation between the controller and the motor voltage.

DESCRIPTION OF THE DRAWINGS

FIG. 1, which is labelled "PRIOR ART",is a schematic circuit diagram of a known motor control circuit which provides dynamic braking;

FIG. 2, is a schematic circuit diagram of a motor control circuit provided by the present invention; and, FIG. 3, is a schematic circuit and partial block diagram of a control system for controlling the operation of a plurality of servo motors.

DESCRIPTION OF THE PRIOR ART

Referring to FIG. 1, which is labelled "PRIOR ART", there is shown a schematic circuit diagram of a conventional motor control circuit 10 which controls the energization and deenergization of a servo motor 11. The control circuit 10 includes a control relay K1 which is operable to connect the motor terminals T1 and T2 to a source of DC potential, and a polarity select relay K2 which is operable to select the polarity of the DC potential applied between the motor terminals T1 and T2. The control relay K1 and the select relay K2 have respective operate windings 12 and 13 which are selectively energized under the control of a controller (not shown).

The polarity select switch K2 is normally deenergized, as illustrated in FIG. 1, such that when the control relay K1 is operated, its contacts K1A complete the energizing circuit for the motor, applying a positive voltage between motor terminals T1 and T2, causing the motor shaft to be driven in one direction. When the select relay K2 is operated, its contacts K2A and K2B reverse the polarity of the voltage applied to the motor terminals so that when relay K1 is operated, the motor shaft is driven in the opposite direction.

In this prior art circuit, dynamic braking is achieved by connecting the motor terminals T1 and T2 together through the contacts K1A of the control relay K1 and a line 15, which is connected between the motor terminal T2 and a pole of contacts K1A. As is known, dynamic braking takes place when a large electrical load is placed on the motor while operating as a generator, i.e., back E.M.F. The motor inertia contains potential energy when power is removed. This potential energy is converted to electrical energy by action of the motor. When no current is allowed to flow (no load) the voltages become very high. This action causes arcing of relay contacts K1A as they travel between the run mode and the motor shorting mode. With the motor shorted, this energy is then converted to current presenting a load to the motor back EMF, causing large current surges through relay contacts K1A which have not yet fully closed. The arcing at the contacts during switching can result in deterioration of the contacts and/or a welded contact failure.

DESCRIPTION OF A PREFERRED EMBODIMENT

Referring now to FIG. 2, there is shown a schematic circuit diagram of a solid state motor control circuit provided by the present invention which controls the operation of a servo motor 11. By way of example, the control circuit may be employed in a heating and air conditioning system which includes a proportional control 29 responsive to the output of a temperature sensor 30, located in a conditioned area, to generate an error or command signal whenever the temperature in the conditioned area rises above or falls below a set point value. The motor control circuit responds to the command signal to energize the motor 11 to move a valve or damper to effect compensation for the temperature change.

The control circuit comprises a comparator circuit 21, including an operational amplifier 22, connected for operation as a differential amplifier, and a drive circuit 23, which is operable when enabled to apply an energizing signal to the motor 11. An input circuit 26, including a control switch 27 and a polarity select switch 28, responds to each command signal provided by the controller 29 to enable the comparator circuit 21.

The differential amplifier 22, which has its differential inputs 22A and 22B connected to motor terminals T1 and T2, respectively, monitors the potential difference across the motor. In the absence of command signal, the differential amplifier controls complementary transistors Q3 and Q4, which comprises the drive circuit 23, to maintain the voltage at motor terminal T1 at the same level as a reference voltage VC/2 which is established at the other motor terminal T2 by a reference circit 24 comprised by Zener diodes Z1 and Z2.

When a command signal is generated by the controller 29, control switch 27 is enabled and operates an analog switch 20 which completes a circuit path SW1 to extend a control signal to input 22A of the amplifier 22. The polarity of the control signal is determined by the state of the select switch 28 which is operated under the control of the controller. Assuming switch 28 is disabled, then a ground level signal extended to input 22A results in a potential difference between the amplifier inputs, since input 22B is at the reference level VC/2. This drives the operational amplifier 22 to positive saturation causing transistor Q3 to be turned on while the transistor Q4 is cutoff. Accordingly a potential near +VC is supplied to terminal T1, providing a potential difference between the motor terminals T1 and T2. The motor is thus energized and via its shaft drives the controlled device 31 to correct for the deviation from the set point indicated by the error signal.

When compensation has been achieved, the controller 29 terminates the command signal, disabling the control switch 27 causing analog switch path SW1 to open. This removes the control signal from input 22A of the differential amplifier 22, and the amplifier seeks to establish a voltage at motor terminal T1 equal to that at terminal T2. The signal level at input 22A, which is connected to the motor terminal T1 through a resistor R5, is then determined by the back emf of the motor. During braking, the differential amplifier 22 operates in its linear mode and responds to the signal fed back from motor terminal T1 and controls drive transistors Q3 and Q4 so that an electrical short is introduced across the motor terminals by sinking or sourcing current to overcome any generated EMF until the voltage at the motor terminal T1 is at the reference level VC/2.

Considering the motor control circuit in more detail, the control switch 27 and the select switch 28 each comprise optical coupler devices Q1 and Q2, respectively, each including an LED and a phototransistor. One example of an optical coupler suitable for this application is the type 4N28 optical coupler commercially available from Motorola. The anodes of the LED's are connected over respective resistors R1 and R2 to the supply voltage Vb of the controller 29, and the cathodes of the LED's are individually connected to outputs of the controller 29. The output circuit of photo transistor Q1, i.e., its collector-emitter circuit, is connected in series with a resistor R3 between the control circuit supply voltage +VC, which is +15 VDC, and ground. The optical couplers isolate the controller voltage VB from the motor control circuit voltage VC.

The analog switch 20 receives its enabling input from the output of control switch 27 and has its switching path SW1 interposed between the output of the select switch 28 and the inverting input 22A of the differential amplifier 22. Thus when control switch 27 operates, a ground level signal is extended to amplifier input 22A when select switch 28 is disabled, and a signal at level +VC, is extended to amplifier input 22A when select switch 28 is enabled. An analog switch suitable for this purpose is one section of the type CD4066A Quad analog switch commercially available from RCA.

Referring to the comparator circuit 21, the differential amplifier 22, which is the National Semiconductor Type LM324 Operational Amplifier, has its inverting input 22A connected over feedback resistor R5 to motor terminal T1, sometimes referred to as the supply terminal of the motor, and its non-inverting input 22B connected directly to the motor terminal T2, sometimes referred to as the motor reference terminal. Reference circuit 24, comprised of two 8.2 V Zener diodes Z1 and Z2, such as the Type 1N5237. The Zener diodes, which are serially connected between the supply voltage +VC and ground, provide a reference voltage at approximately level VC/2 at the motor reference terminal T2.

As indicated above, the voltage at the supply terminal T1 of the motor is controlled by the differential amplifier 22 through the drive circuit 23. The drive circuit 23 comprises complementary transistors Q3 and Q4, such as the Types 2N3904 and 2N3906, respectively, which operate as a bipolar current amplifier. The collector-emitter circuit of transistor Q3 and the emitter-collector circuit of transistor Q4 are connected in series between the supply voltage +VC and ground, the bases of transistor Q3 and Q4 being connected through respective resistors R6 and R7 to the output 22C of the differential amplifier. The output of the current amplifier at the junction of the emitters of the transistors Q3 and Q4 is connected to motor terminal T1.

The conductivity of transistors Q3 and Q4 is controlled by the signal output of the differential amplifier which increases or decreases as a function of the potential difference applied to its differential inputs 22A and 22B. A command signal of one sense, which results in the enabling of both transistors Q1 and Q2, provides a signal at level +VC at input 22A of the amplifier. This signal causes the amplifier 22 to be driven to negative saturation so that its output goes low, turning on transistor Q4 while cutting off transistor Q3 so that ground is extended to motor terminal T1. Conversely, for command signal, of the opposite sense, a ground level signal is provided at amplifier input 22A, causing the amplifier 22 to be driven to positive saturation, turning on transistor Q3 while cutting off transistor Q4 so that +VC is extended to motor terminal T1.

In summary, the comparator circuit 21, including the differential amplifier 22 and drive circuit 23, responds to the application of a control signal to amplifier input 22A to connect the positive (or negative voltage) to the motor terminal T1 to energize the motor. Upon removal of the control signal from amplifier terminal 22A, the amplifier 22 responds to a negative feedback signal supplied to its terminal 22A from the motor terminal T1 through resistor R5 to control transistors Q3 and Q4 to equalize the potentials at the two motor terminals, deenergizing the motor and approximating a dynamic braking function.

Operation

When power is applied, the Zener diodes Z1 and Z2 apply the reference voltage VC/2 to the motor reference terminal T2. When the control switch 27 is disabled, the analog switch path SW1 is open, allowing the differential amplifier 22 to control transistors Q3 and Q4 to maintain the voltage at the motor supply terminal T1 at the reference level VC/2. For such condition, the potential at both inputs 22A and 22B of the differential amplifier 22 is approximately VC/2.

When the controller 29 generates a command signal of one sense, indicating, for example that the sensor 30 has sensed a decrease in the temperature in a conditioned area relative to the set point value, then phototransistor Q1 conducts, enabling the analog switch to close its switch path SW1. Phototransistor Q2 remains disabled so that a ground level signal is extended to input 22A of the differential amplifier 22. The potential difference thus provide between the inputs 22A and 22B of the differential amplifier drive it to positive saturation and its output goes high turning on transistor Q3 and cutting off transistors Q4. Accordingly, the supply voltage VC is applied to motor terminal T1, causing the motor to rotate its shaft in a forward direction, for example. As the motor shaft rotates, the controlled device 31 is operated to return the controlled parameter back to the set point value.

When the set point is reached, the controller 29 terminates the command signal causing control switch phototransistor Q1 to be disabled. When transistor Q1 is disabled, the analog switch SW1 opens, disconnecting the control voltage from the input 22A of the differential amplifier.

When the control voltage is removed from the input 22A of the differential amplifier 22, the signal level at the input terminal 22A is controlled by the signal fed back thereto from the motor terminal T1 through resistor R5. Initially, since transistor Q3 is conducting, the signal level is a +VC, i.e., opposite in sense to the command signal. Accordingly, the operational amplifier 22 is driven towards negative saturation, causing transistor Q3 to turnoff. However, as transistor Q3 turns off, the signal +VC is removed from the motor terminal T1, and the back EMF of the motor controls the signal level at the amplifier input 22A. As indicated above, the stopped operational amplifier operates in its linear mode during the braking operation. During braking, an electrical short is introduced across the motor by sinking or sourcing current to overcome any generated back EMF as controlled by the feedback operation of the comparator circuit 21. No polarity exists across the motor with the exception of the amplifier offset voltage. The operational amplifier returns the signal level at the motor supply terminal T1 to the reference voltage VC/2.

The operation of the motor control circuit in response to a command signal of the opposite sense is similar to that described above except that the select switch 28 is also enabled by the controller 29 so that when the control switch 27 operates analog switch 20, a positive signal at level +VC is extended to the input 22A of the differential amplifier 22 causing it to be driven to negative saturation. For such condition, transistor Q4 is turned on extending a ground level to the motor supply terminal T1 causing the motor to drive its shaft in the opposite direction.

Referring to FIG. 3, there is shown a control system in which the operation of a plurality of motors 11a-11d is controlled by a single controller (not shown). Each of the motors such as motor 11a has an associated select switch 27a, analog switch 20a, and comparator circuit 21a which are the same as those described above with reference to FIG. 2. A common select switch is used to select the polarity of the control signal supplied to each of the comparator circuits 21a-21d. Also, a common reference circuit 24 comprised of Zener diodes Z1 and Z2 provides the reference level VC/2 at the reference terminals T2 of each of the motors 11a-11d.

As shown in FIG. 3, the input circuits for the four control switches 27a-27d, which may comprise the Type ILQ74 QUAD photocoupler commercially available from Litronix and switch 28 each have one terminal connected to the controller supply voltage +VB through resistors R1 and R2. The controller supplies a ground level, selectively, to inputs 27-1 through 27-4 and 28-1 to effect the operation of the desired motors 11a-11d. The appropriate control switch 27A-27D responds to the application of a command signal to its input 27-1 through 27-4 to operate its corresponding one of the four analog switches 20a-20d, which comprises a Type CD4066B QUAD analog switch module, and thereby effect energization of the associated motor 11a-11d.

For example, assuming the command signal provided by the controller indicates a need for compensation for deviation in temperature in the areas served by the functional devices controlled by motors 11a and 11d, then the controller extends a ground level to inputs 27-1 and 27-4 to operate analog switches 20a and 20d. This extends a control signal to the inputs of the associated comparator circuits 21a and 21d, the polarity of the control signal depending upon whether or not the select switch 28 is operated. The motors 11a and 11d are then energized to operate their associated functional devices to return to controlled parameter to the set point value.

It is pointed out, that the controller affords selective operation of each of the four motor control circuits illustrated in FIG. 3 and that during a given operating cycle, each of the four motor control circuits may be enabled or disabled, at different times, as a function of the correction needed for maintaining the temperature in the corresponding zone at the set point value.

Having thus disclosed in detail preferred embodiments of the invention, persons skilled in the art will be able to modify certain of the structure which has been disclosed and to substitute equivalent elements for those which have been illustrated; and it is, therefore, intended that all such modifications and substitutions be covered as they are embraced within the spirit and scope of the appended claims.

We claim:

1. A motor control circuit for controlling the energization of a motor to effect selective bidirectional rotation of a shaft of the motor in response to command signals supplied to the control circuit, said control circuit comprising:

input means responsive to each command signal to generate a control signal of a sense indicative of the desired direction of rotation of the shaft;

comparator circuit means having a first input coupled to an output of said input means and to a first terminal of the motor, a second input coupled to a second terminal of the motor, and an output coupled to one of said terminals of the motor, said comparator circuit means responding to each control signal to provide a potential of selected polarity between terminals of the motor, thereby energizing the motor; said comparator circuit means being effective upon removal of said control signal from its first input to deenergize the motor and effectively interconnect said motor terminals, whereupon the motor generates a back emf, and said comparator circuit responding to said back emf to equalize the potentials at said motor terminals.

2. A motor control circuit as set forth in claim 1 wherein said comparator circuit means comprises a differential detecting circuit having a first input connected to said output of said input means and coupled to said first motor terminal, and a second input coupled to said second terminal of the motor, a drive circuit interposed between an output of said differential detecting circuit and said first motor terminal, and a reference circuit connected to said second motor terminal for establishing a reference voltage at said second motor terminal.

3. A motor control circuit for controlling the energization of a motor to effect selective bidirectional rotation of a shaft of the motor in response to the command signals supplied to the control circuit, by a controller, said control circuit comprising:

differential detecting circuit means having first and second inputs coupled to respective first and second terminals of the motor;

drive circuit means connected between an output of said differential detecting circuit means and one of said motor terminals, and operable to control the voltage level at said one motor terminal, said differential detecting circuit means being operable in the absence of a command signal to respond to the voltages at its inputs and control said drive circuit means to maintain the voltages at said first and second motor terminals at substantially the same level;

and input means responsive to a command signal to generate a control signal for application to one of said inputs of said differential detecting circuit means to establish a potential between said inputs, said differential detecting circuit means responding to the potential to enable said drive circuit means to connect said one motor terminal to an output of a power source to establish a potential of a selected polarity between the first and second terminals of said motor thereby energizing said motor, effecting rotation of the motor shaft in a selected direction; and said differential detecting circuit means being operable upon the removal of the control signal from its input to control said drive circuit means to disconnect said first motor terminal from said power source thereby deenergizing the motor, and said differential detecting circuit means responding to a potential provided between the motor terminals, upon deenergization of the motor, to control said drive circuit means to reestablish substantially equal voltages at said motor terminals.

4. A control circuit as set forth in claim 2 wherein said input means includes select means responsive to said command signal to determine the sense of said control signal.

5. A control circuit as set forth in claim 4 wherein said input means further comprises enable means responsive to each command signal to connect the output of said select means to said one input of said differential detecting circuit means.

6. A control circuit as set forth in claim 5 wherein said select means and said enable means each comprise a photosensitive switching transistor which electrically isolates the controller from the motor control circuit.

7. A control circuit as set forth in claim 3 wherein said differential detecting circuit means comprises a differential amplifier having a first input coupled to said first motor terminal and a second input coupled to said second motor terminal, and feedback means interposed between said first motor terminal and said first amplifier input for extending a feedback signal to said first amplifier input upon removal of the control signal from said first amplifier input.

8. A system as set forth in claim 3 which comprises reference circuit means for establishing a reference voltage at said second motor terminal, said differential detecting circuit means being operable in the absence of a command signal to cause said drive circuit means to maintain the voltage at said first motor terminal at said reference level.

9. A control circuit as set forth in claim 8 wherein said differential detecting circuit means responds to a control signal of a given sense to cause said drive circuit means to increase the voltage at said first motor terminal relative to said reference level and responds to a control signal of a different given sense to cause said drive circuit means to decrease the potential at said first motor terminal relative to said reference level.

10. In a control system including a plurality of motors each individually energizable for operating an associated functional device, a control circuit responsive to command signals supplied thereto to control the operation of said motors, comprising:

a plurality of comparator circuits each individually associated with a different one of said motors, each of said comparator circuits having a first input coupled to a first terminal of its associated motor and a second input coupled to a second terminal of its associated motor, and an output coupled to said first motor terminal;

reference circuit means commonly connected to said second terminals of said motors for providing a reference voltage of a given level at said second motor terminals;

each said comparator circuit being operable in the absence of a command signal to maintain the voltage at said first motor terminal at the level of said reference voltage;

and input means including select means responsive to each command signal to provide a control signal of a sense indicative of desired rotation of the shafts of the motors, and a plurality of enable means each individually associated with a different one of said comparator circuits and individually operable in response to said command signal to extend the control signal to the first input of its associated comparator circuit, each comparator circuit being responsive to the application of a control signal to its first input to establish a potential of a predetermined polarity between the first and second terminals of its associated motor, and each of said comparator circuits being responsive to the removal of the control signal from its first input to deenergize the motor and to return the voltage at said first terminal of its motor to the level of the reference voltage.

* * * * *